W. F. KENNEY.
NUT LOCK.
APPLICATION FILED OCT. 14, 1908.

932,398.

Patented Aug. 24, 1909.

WITNESSES
Colin M. Holmes.
Howard A. Lamprey.

INVENTOR
William F. Kenney
per S. Scholfield
ATTORNEY

UNITED STATES PATENT OFFICE.

WILLIAM F. KENNEY, OF PROVIDENCE, RHODE ISLAND.

NUT-LOCK.

932,398.

Specification of Letters Patent. Patented Aug. 24, 1909.

Application filed October 14, 1908. Serial No. 457,713.

*To all whom it may concern:*

Be it known that I, WILLIAM F. KENNEY, a citizen of the United States, residing at Providence, in the State of Rhode Island, have invented a new and useful Improvement in Nut-Locks, of which the following is a specification.

The nature of my invention consists in the improved construction of the reversely threaded locking-screw, and in the improved combination of the locking-nut and screw, as hereinafter set forth.

Figure 1:
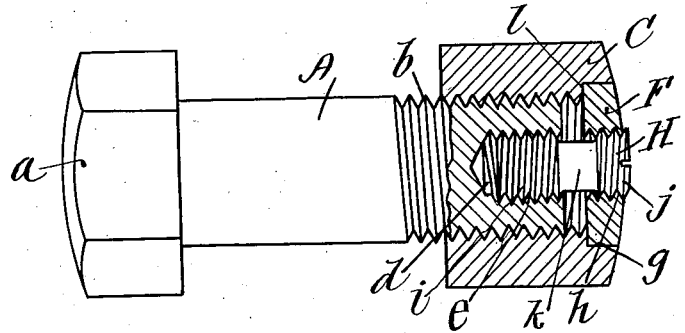
Figure 2:
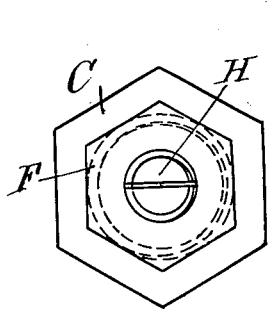
Figure 3:
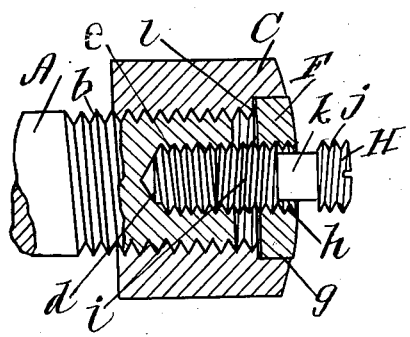

In the accompanying drawing:—Figure 1 represents a side view and partial longitudinal section of a bolt provided with my improved nut-lock, the locking-screw being shown in full engagement. Fig. 2 represents an end view showing the outer sides of the nuts and the end of the locking-screw. Fig. 3 represents a longitudinal section of the end of the bolt showing the locking-screw in partial engagement.

In the accompanying drawing, Fig. 1, A represents a bolt having an hexagonal head $a$, a right hand screw thread $b$, and a reversely threaded bore $d$, the screw thread $e$ of the said reversely threaded bore being preferably made of less pitch than that of the said screw thread $b$. The hexagonal locking-nut F fits into the hexagonal recess $g$ made in the bore of the bolt nut C, which recess serves to prevent the said locking-nut from turning relatively to the bolt nut, while at the same time, the diametrical positions of the two nuts relatively to each other may be varied as desired. The locking-screw H is provided at its inner portion with a screw thread $i$, fitting the screw thread $e$ of the bore of the bolt, and the outer portion of the said screw is provided with the corresponding screw thread $j$, which is disconnected from the thread $i$ and fits the thread $h$ of the locking-nut, and the vacant space $k$ between the threads $i$ and $j$ is made slightly greater than the thickness of the said nut.

In the employment of this improved nut-lock, the bolt nut C is to be first screwed up to its holding-seat, then the locking-nut F is to be inserted into the hexagonal recess $g$, of the bore of the bolt nut and held up against the shoulder L and then upon inserting and screwing up the locking-screw H, it may be found that the bolt nut has been so turned upon the screw thread of the bolt that upon the arrival of the threads of the locking-screw to the position shown in Fig. 3, the inner face of the locking nut F will be thrown back to a slight distance from the shoulder L. Then upon the continued forward movement of the locking-screw the locking-nut will become released from the thread $i$ at the vacant space $k$, so that upon the arrival of the screw thread $j$ in contact with the said locking-nut, the said nut will be carried up to its seat at the shoulder L, as is required for the proper action of the nut-lock, otherwise, a certain degree of backlash would occur between the said nut F, and the shoulder L, thus allowing a limited backward turning of the nut C upon the bolt A. And in order to produce this result it is necessary as above set forth, to make the vacant space $k$ between the threads $i$ and $j$ slightly greater than the thickness of the locking nut in order that the place of the ending of the thread $i$ and the commencement of the thread $j$ may be located in different axial planes.

Whenever the nut C is tightened up to a position which does not allow the screw threads of the locking-nut F and of the bore of the bolt to coincide, when the face of the said locking-nut is in contact with the shoulder L, then the entrance of the locking-screw will be resisted by reason of the disagreement of the said threads, and by changing the relative position of the locking-nut in its holding recess $g$, the desired degree of tightness between the threads of the engaged members may be obtained as is set forth and claimed in my Letters Patent of the United States No. 886,299.

I claim as my invention:—

The combination of a bolt provided with an external screw thread and a reversely screw-threaded bore, a reversely screw-threaded locking nut held from rotation by positive engagement with the bolt nut and a locking screw having a thread adapted to fit the thread of the bore of the bolt and a separate thread adapted to fit the thread of the bore of the locking nut and having a vacant space between the said threads whereby the locking nut may be brought up to its bearing seat and backlash of the nut-lock be prevented.

WILLIAM F. KENNEY.

Witnesses:
SOCRATES SCHOLFIELD.
BENJAMIN L. DENNIS.